(12) United States Patent
Yang et al.

(10) Patent No.: US 10,122,807 B2
(45) Date of Patent: Nov. 6, 2018

(54) COMPUTER-IMPLEMENTED METHOD, A NETWORK DEVICE AND COMPUTER PROGRAM PRODUCTS FOR TRACKING OPT-OUT USER PREFERENCES IN A GLOBAL COMMUNICATION NETWORK

(71) Applicant: TELEFONICA DIGITAL ESPAÑA, S.L.U., Madrid (ES)

(72) Inventors: Xiaoyuan Yang, Madrid (ES); David Guijarro Guillem, Madrid (ES); Arcadio Pando Cao, Madrid (ES); Martin I. Levi, Madrid (ES)

(73) Assignee: TELEFONICA DIGITAL ESPANÑA, S.L.U., Madrid (ES)

( * ) Notice: Subject to any disclaimer, the term of this patent is extended or adjusted under 35 U.S.C. 154(b) by 228 days.

(21) Appl. No.: 14/993,518

(22) Filed: Jan. 12, 2016

(65) Prior Publication Data
US 2016/0205208 A1 Jul. 14, 2016

(30) Foreign Application Priority Data
Jan. 13, 2015 (EP) .................................... 15382004

(51) Int. Cl.
*G06F 15/16* (2006.01)
*H04L 29/08* (2006.01)
*G06F 17/30* (2006.01)

(52) U.S. Cl.
CPC ........ *H04L 67/22* (2013.01); *G06F 17/30867* (2013.01)

(58) Field of Classification Search
CPC ........... G06F 17/30867; G06F 21/6263; G06F 17/2247; G06F 17/30011; G06Q 30/02; H04L 67/10; H04L 69/329
See application file for complete search history.

(56) References Cited

U.S. PATENT DOCUMENTS

| 2010/0024032 A1* | 1/2010 | Britton ................... G06Q 30/02 726/22 |
| 2011/0022681 A1* | 1/2011 | Simeonov .............. G06Q 30/02 709/217 |
| 2011/0208850 A1* | 8/2011 | Sheleheda ......... G06F 17/30867 709/223 |

OTHER PUBLICATIONS

European Search Report for 15 38 2004 dated Jul. 31, 2015.

* cited by examiner

*Primary Examiner* — Aftab N Khan
(74) *Attorney, Agent, or Firm* — Sughrue Mion, PLLC

(57) ABSTRACT

A computer implemented method and network device for tracking OPT-OUT user preferences in a global communication network and computer programs thereof,
The method comprising performing, by at least one a user, at least one operation request for a service of an online system (500); tracking, by a network device (300), said operation request and detecting if it is linked to a tracking mechanism, wherein: a) if it is not linked to a tracking mechanism, said network device (300), bypasses the operation request to said online system (500) without performing any action; or if it is linked to a tracking mechanism, the network device (300), identifies whether an OPT-OUT or an Opt-In status related to the user is included in the operation request and sends or not the operation request to a tracking server (600) depending on the result of said identification.

8 Claims, 3 Drawing Sheets

COMPUTER-IMPLEMENTED METHOD, A NETWORK DEVICE AND COMPUTER PROGRAM PRODUCTS FOR TRACKING OPT-OUT USER PREFERENCES IN A GLOBAL COMMUNICATION NETWORK

This application claims priority from European Patent Application No. 15382004.8 filed Jan. 13, 2015, the contents of all of which are incorporated herein by reference in their entirety.

FIELD OF THE INVENTION

Present invention generally relates to automated monitoring systems and methods. In particular, the invention relates to a computer implemented method, a network device and computer program products for tracking OPT-OUT user preferences in a global communication network.

BACKGROUND OF THE INVENTION

The Internet is experiencing one of the most significant changes since its creation in the 1980s. New services are launched every day, creating new sources of personalized data collected by increasingly sophisticated devices featuring multiple sensors that measure everything possible in real-time. The explosion of data is so drastic that Telco companies are expecting a 10-fold increase in mobile network traffic within the next few years.

All collected data will create more online services that will provide consumers with increasingly more personalized experiences. However, data collection could be also abusive for end-users. For instance, the behavior of end-users in one website could be monitored by tracking mechanisms and used to show targeted advertisements on other websites, without any end-user's concern.

Most of online services do provide mechanisms that end-users could OPT-OUT tracking mechanisms so prevent targeting service optimizations. For example, Google provides mechanisms to allow end-users to disable its analytic service, so user's visits to different web sites are not reported. Almost all OPT-OUT mechanisms are based on creating a specific cookie in the browser that indicates the desire of the end-user to be not tracked.

However, such OPT-OUT mechanisms are most of the cases not simple to use or end-users are just not aware of their existence. Different tracking entities use different cookies and there is not any mechanism/agreement that allows end-users to OPT-OUT to all entities.

Furthermore, most of mechanisms are not persistent and end-users automatically OPT-IN again to the data collection whenever they reset the history of their devices or web browsers. Depending on implementation of browsers and the allocated capacity for store cookies, OPT-OUT cookies could be removed automatically, when there is a shortage in the capacity.

All already mentioned factors and others such as name changes of the OPT-OUT cookie, domain changes or even new trackers, make the current OPT-OUT mechanism difficult to use for end-users.

Even though, there exist software's that could be installed in end-user devices that could help opt-out process, such software's are not always available in all the devices.

In order to help end-users to OPT-OUT online tracking mechanisms, different solutions are available in the market.

Most of solutions are based on installing software in the end-user devices. Specifically, a plug-in in the browser that end-user has in the device. For instance, AdBlock Plus plug-in is available for most popular browsers, such as Microsoft Explorer, Firefox and Chrome. The community of AdBlock Plus maintains a database of online trackers that is constantly updated with crowdsourcing effort.

Other popular plug-ins that is specific for tracking prevention is Ghostery. In this case, the solution maintains a list of around two thousand trackers and invites end-users to share information to discover new trackers.

Other solutions such as NoScript allow end-users to stop the execution of JavaScript that are identified as tracking mechanisms. TrackerBlock, in other hand, maintains a list of 500 trackers and blocks identification information in HTML5 storage. Some tracking companies indeed do also provides software-based solutions such as the one proposed in U.S. Pat. No. 8,370,475 to keep the end-users' choice to be OPT-OUTed.

Software based solutions are effective to OPT-OUT tracking mechanisms and their effectiveness depends strongly on the accuracy of the database that list the online trackers. The main drawback of this kind of solutions is the fact that is not universal. For instance, some browsers, such as Safary®, do not allow third party plug-ins. The solution is neither available in all environments. Solutions such as AdBlock Plus are not available in Android® ecosystem. Other disadvantage of software-based solutions is the fact that they require computational resources in the end-users devices. Whereas this is not a problem in desktop environment, it becomes a huge barrier for adoption in mobile devices.

Different online tracking companies do also response to the social concerns by offering OPT-OUT options to end consumers, by providing a centralized way to test the current OPT-OUT status for different trackers. The basic mechanism behind is similar to the test system that is proposed in U.S. Pat. No. 8,793,534 B2. Furthermore, the web site allows end-users to select which tracker they want to OPT-IN to share the behavior information.

The advantage of this option is collaboration nature between end consumers and tracking companies. However, this option is not always well known for end-users and are neither easy to use. For instance, OPT-OUT mechanisms of different tracking companies are not identical and should be done case by case. Other disadvantage is the non-persistence of the OPT-OUT option that does provide software based solution.

In U.S. Pat. No. 7,562,387 B2 it is proposed to use a network element to send cookie with privacy flag, when end-users want to OPT-OUT. Such a solution, however, doesn't work when behavior tracking is performed using end-to-end Encrypted Hyper text Transfer Protocol (HTTPS) connections, where network element can't see or modify the traffic between end-user and origin server.

SUMMARY OF THE INVENTION

Present invention is about a network-oriented system that helps end-users to OPT-OUT the data-collection mechanisms that track the end-user behavior in Internet by using both unencrypted HTTP and encrypted HTTPS connections.

Embodiments of the present invention provide according to a first aspect a computer-implemented method for tracking OPT-OUT user preferences in a global communication network, the method comprises performing, by at least one computing device of a user whose OPT-OUT preferences, and/or online usage, are going to be tracked, at least one operation request for a service of an online system through said global communication network; tracking, by a network device, said performed at least one operation request; and detecting, by the network device, if said tracked operation request is linked to a tracking mechanism.

In case a result of said detection indicates that the operation request is not linked to a tracking mechanism, the network device bypasses the operation request to the online system without performing any action. Alternatively, in case the result of said detection indicates that the operation request is linked to a tracking mechanism, the network device also identifies whether an OPT-OUT or an OPT-IN status is included in the operation request and sends or not the operation request to a tracking server depending on the result of said identification.

The user preferences indicate a desire of the user that information about him/her, such as click information when the user visiting other different online services, when performing the operation request not be collected.

The identification of the OPT-OUT or an OPT-IN status involves identifying if an OPT-OUT cookie indicative of the user preferences is included in the operation request and identifying the OPT-OUT user preferences for said service.

According to an embodiment, if the result of the identification indicates that the user wants to be OPT-OUT in said service but the operation request does not include an OPT-OUT cookie, the network device includes in the operation request a public OPT-OUT cookie indicating the OPT-OUT user preferences for said service; removes information about the user included in the operation request; and sends the operation request to the tracking server.

According to another embodiment, if the result of the identification indicates that the user wants to be OPT-IN in said service and the operation request includes an OPT-OUT cookie, the network device includes a cookie expiration instruction in the operation response containing an expiration data for the OPT-OUT cookie previously included in the operation request.

According to yet another embodiment, if the result of the identification indicates that the user wants to be OPT-OUT in said service and the operation request includes an OPT-OUT cookie, the network device removes any information about the user included in the operation request; and sends the operation request to the tracking server.

In addition, the network device also tracks a response from the tracking server to the user of the operation request for said service, and includes in the response the public OPT-OUT cookie indicating the OPT-OUT user preferences for said service.

According to another embodiment, and for the case that encrypted HTTPS connections are used by the tracking server, the network device instructs the end-user computing device to generate extra unencrypted HTTP request to tracking domains. The network device captures the extra unencrypted request and responses with the correspondent OPT-OUT cookie. As a consequence, subsequent encrypted HTTP requests to the tracking domain will contain the OPT-OUT cookie injected in previous extra unencrypted request.

The extra unencrypted request to tracking domain is generated by modifying the response of unencrypted HTTP requests to other service domains. For instance, the network device can inject additional un-encrypted HTTP request to tracking domain for a transparent image of a certain pixel size, e.g. one pixel size, at the end of any html body of said unencrypted HTTP requests or in a first line of a head section of an html body, e.g. as an empty JavaScript, of said unencrypted HTTP requests to other service domains.

Embodiments of the present invention also provide a network element for tracking OPT-OUT user preferences in a global communication network, including: a first database storing OPT-OUT user preferences defined by at least one user about information the user wants to share in different tracking mechanisms; a second database storing tracking information of services of an online system; a third database configured to store a current status of said OPT-OUT user preferences when the user performing an operation request for at least one service of the online system through said global communication network; and analyzing means configured for: tracking the operation request; detecting if said tracked operation request is linked to a tracking mechanism; and depending on a result of said detection bypassing the operation request to said online system; or performing a series of operations to identify whether an OPT-OUT or an OPT-IN status is included in the operation request and send or not the operation request to a tracking server depending on the result of said identification.

The network device also includes a cookie injection unit configured to include in the operation request a public OPT-OUT cookie indicating the OPT-OUT user preferences for said service, and a cleaning unit configured to remove information of the user included in the operation request; or including a cookie expiration instruction in the operation response which contains an expiration data for an OPT-OUT cookie previously included in the operation request.

In addition, the cookie injection unit is further configured to include the public OPT-OUT cookie in a response of the operation request for said service performed from the tracking server to the user.

The network element also includes an injection scheduler unit configured to include in the operation request, when the tracking server uses encrypted HTTP connections, an additional data field containing an unencrypted HTTP request indicating the OPT-OUT user preferences for said service.

Other embodiments of the invention that are disclosed herein include as software programs products to perform the method embodiment steps and operations. More particularly, a computer program product is one embodiment that has a computer-readable medium including computer program instructions encoded thereon that when executed on at least one processor in a computer system causes the processor to perform the operations indicated herein as embodiments of the invention.

Present invention provides a network-oriented system for user behavior tracking OPT-OUT that works both in unencrypted and encrypted traffic. It is much easier to use for end-users that only need one-click to OPT-OUT all tracking mechanisms. Moreover, it doesn't require any additional software in the computing device, so it doesn't consume any resource in the end-user's computing device. The OPT-OUT mechanism of the invention is persistent and the selected option doesn't disappear with history cleaning-up of devices.

BRIEF DESCRIPTION OF THE DRAWINGS

The previous and other advantages and features will be more fully understood from the following detailed description of embodiments, with reference to the attached, which must be considered in an illustrative and non-limiting manner, in which.

DETAILED DESCRIPTION OF SEVERAL EMBODIMENTS

Figure 1:
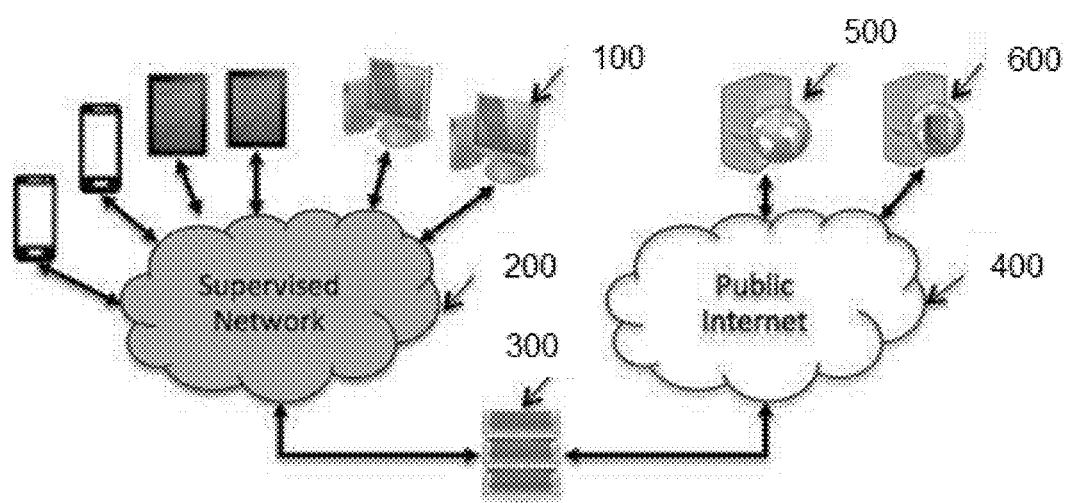
FIG. 1 illustrates a general architecture and different entities to perform a method for tracking Opt-Out user preferences in a global communication network in accordance with present invention.

FIG. 1 shows different entities that present invention may use for performing the proposed method for tracking OPT-OUT user preferences. All computing devices 100 join to a supervised network 200 to connect to the online systems/services 500 allocated in a global network such as the public Internet 400.

Each time an end-user, via a computing device 100, requests an operation, e.g. accesses a web page, of an online system 500, one or multiple explicit requests are sent to a tracking server 600, indicating information about the behavior of the end-user in the web page. A network device 300 supervises or tracks all traffic of the computing device 100. Both unencrypted and encrypted traffic are supervised. The network device 300 may be for instance an explicit/transparent proxy or a network deep packet inspection device (DPI).

Figure 2:
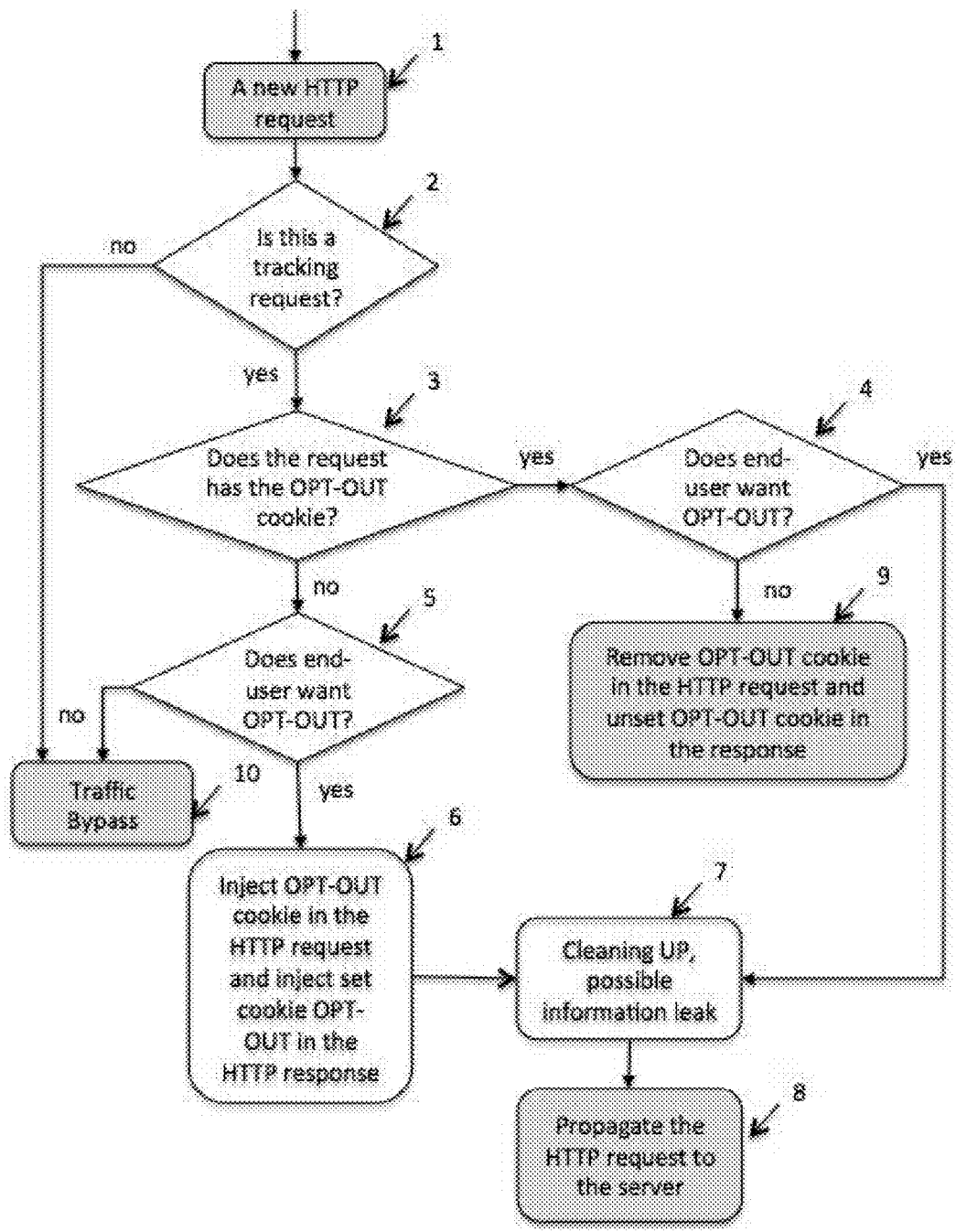
FIG. 2 is a flow diagram illustrating different steps for carrying out a method for tracking Opt-Out user preferences, for unencrypted HTTP traffic, in accordance with different embodiments of the present invention.

In order to provide the behavior tracking OPT-OUT of the tracking server 600, the tracking server 600 specifies an OPT-OUT cookie. Tracking server 600 does also agree that it will not perform any behavior tracking of end-user if a request to the service contains an OPT-OUT cookie. Each tracking server 600 can has its own cookie for OPT-OUT, including multiple cookies with certain value. OPT-OUT cookie of each tracking server 600 is public and well-known.
OPT-OUT Cookie Injection for Unencrypted HTTP Traffic FIG. 2 shows the sequence diagram of different supervise operations that network device 300 may execute to perform tracking OPT-OUT assistance. Given an operation request performed by the end-user, such as an HTTP request (step 1), the network device 300 first detects if it is an operation request linked to a tracking mechanism (step 2). If it is not a request to any tracking mechanism, the HTTP request is bypassed to the online system 500 without any modification (step 10). Otherwise, the network device 300 checks (step 3) whether the request contains an OPT-OUT cookie.

According to a first embodiment, if the operation request contains the OPT-OUT cookie (3) and the end-user wants to be OPT-OUTed (step 4), the network device 300 removes all possible information about the user leaking in the operation request (step 7), (i.e. network device 300 removes any possible sensible information about the end-user that should not be propagated to the tracking server 600). After possible cleaning up (step 7), the HTTP request will be sent to tracking server 600 (8).

According to a second embodiment, in case that the request contains the OPT-OUT cookie (step 3) and end-user doesn't want to be OPT-OUTed, meaning that the end-user wishes to be OPT-IN in the tracking server 600, in such a case, the network device 300 removes the already included OPT-OUT cookie (step 9). Furthermore, network device 300 includes a cookie expiration instruction to remove the OPT-OUT cookie of that specific tracking server 600. The cookie expiration instruction contains an expiration data for the Opt-Out cookie previously included in the operation request.

According to a third embodiment, if the operation request doesn't contains the OPT-OUT cookie (step 3) and the end-user doesn't want to be OPT-OUTed (step 5), then the HTTP request will be bypassed to the tracking server 600 without any change. Otherwise, the network device 300 will include a public OPT-OUT cookie into the HTTP request (6) and removes all possible information about the end-user leaking (step 7) before propagating the HTTP request to the tracking server 600 (step 8).

According to a fourth embodiment, in step 6, the network device 300 also injects the public OPT-OUT cookie in the HTTP response from the tracking server 600, so all subsequent requests have already the OPT-OUT cookie.
OPT-OUT Cookie Injection for Encrypted HTTPS Traffic Network middleware devices cannot examine any encrypted operation request (e.g. HTTPS request) to a tracking server 600. Hence, the network device 300 cannot check if the OPT-OUT cookie is present in the HTTPS request; neither can change any field of the HTTPS request. Consequently, in order to include the public OPT-OUT cookie to tracking server 600 that use encrypted HTTPS connections, the network device 300 first detects any HTTP request to the online system 500 or to other online systems that responses an html page, so before sending the html page to the end-user, the network device 300 injects/includes an additional data field such as an html tag that contains an unencrypted HTTP request to the domain of the tracking server 600 that the end-user wants to OPT-OUT. This unencrypted HTTP request is used as a hook request to perform OPT-OUT cookie injection in the next operation request.

According to a first alternative, network device 300 injects a 1×1 pixel transparent image at the end of the html body such as:

```
<html>
    <head>
        ...
    </head>
    <body>
        ...
        <img src="http://tracking.domain/hook_url"></img>
    </body>
</html>
```

According to a second alternative, network device 300 injects the hook request just in the first line of head section of html. The advantage of this second alternative is that it can block tracking requests inside the current web page. However, this second alternative has the disadvantage that it is possible that the page blocks due to the download process of hook request from the network device 300.

```
<html>
    <head>
        <script src="http://tracking.domain/hook_url"></script>
        ...
    </head>
    <body>
        ...
    </body>
</html>
```

Figure 3:
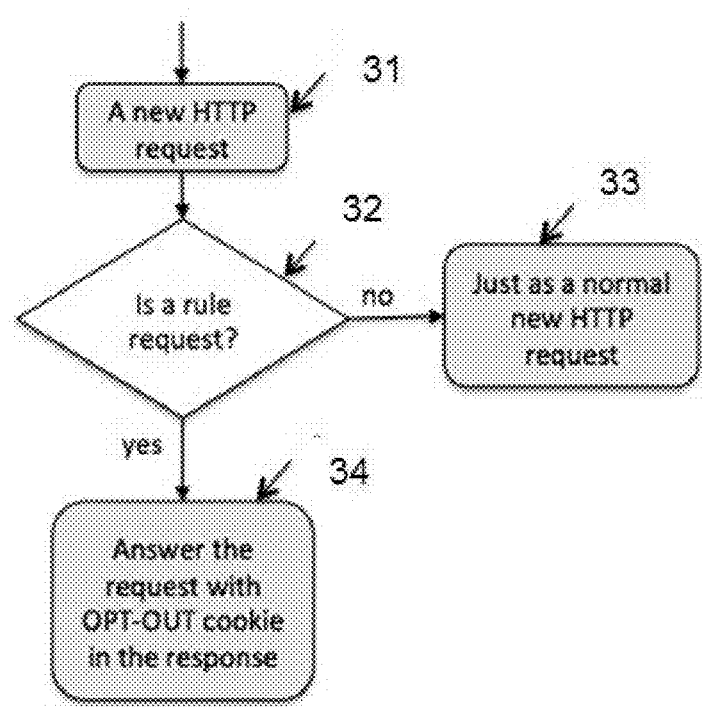
FIG. 3 is a flow diagram illustrating extra steps required for tracking Opt-Out user preferences when traffic to tracking domain is encrypted.

Next, the network device checks if an unencrypted HTTP request is a hook request in accordance with the process steps illustrated in FIG. 3. If an unencrypted HTTP request is a hook request (step 32) the network device 300 synthetizes the response and introduces the public OPT-OUT cookie. Otherwise, the HTTP request will follow the same supervision mechanism defined in FIG. 2.

Figure 4:
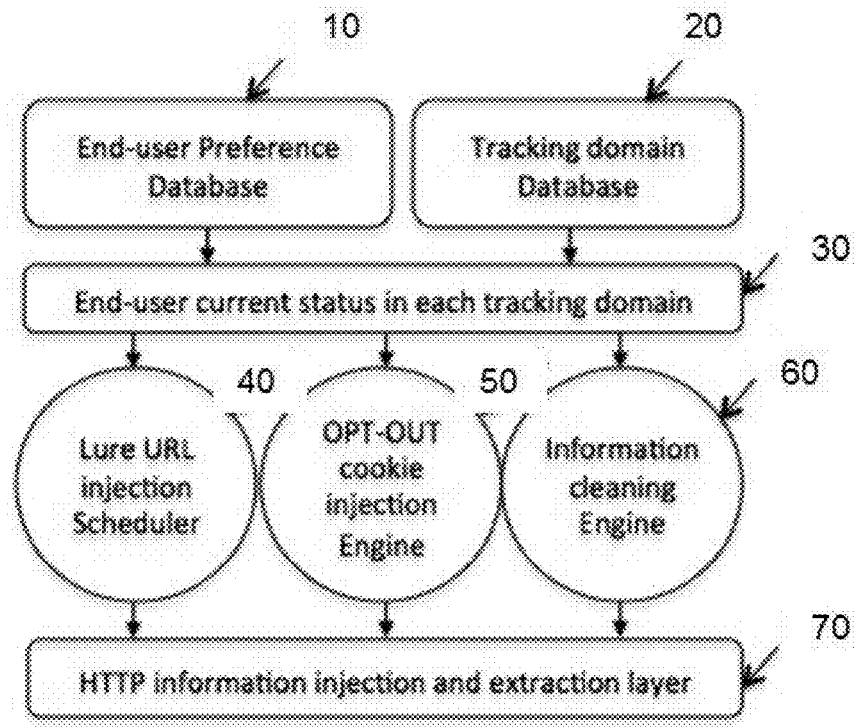
FIG. 4 is an illustration showing a network device for performing tracking Opt-Out user preferences in accordance with different embodiments of the present invention.

With reference to FIG. 4 shown therein is a general architecture in accordance with different embodiments of the network device 300 that performs the OPT-OUT public cookie injection. Each end-user defines their user preferences in sharing its behavior information for each tracking server 600. The user's preference information is stored in a first database 10, or end-user preference database, which is updated in real-time according to end-user's desire.

Apart from that, all list of tracking mechanisms are stored in a second database 20, or tracking domain database. All information related how each domain performs the tracking OPT-OUT is also available in 20. For instance, the name of the public OPT-OUT cookie that is injected to the operation requests is defined per tracking domain in the tracking domain database 20. If a tracking domain uses multiple cookies, the information is also available in the tracking domain database 20. Furthermore, all other cookies that are used to implement end-user tracking are also specified in the tracking domain database 20.

Since cookie-based OPT-OUT mechanism is not persistent, an end-user that had OPT-OUT can unconsciously be OPT-INed to be tracked each time that OPT-OUT cookie is removed in the end-user computing device. For instance, each time that end-user cleans manually the browsing history, end-user OPT-INs again to all tracking servers. The real current tracking status of each end-user is detected by the network device 300 and stored in a third database 30. Basically, each time that network device 300 sees the OPT-OUT cookie in a request to a tracking domain, the network device 300 knows that end-user OPT-OUT option to that domain is still valid. Information stored in the third database 30 is also necessary to implement tracking OPT-IN, when a user decides to share information with a certain tracking domain.

All operations related with information injection and analysis to/of HTTP requests and responses are based on module 70 (HTTP information injection and extraction layer), where all HTTP information can be manipulated. This module it could be part of a HTTP proxy or a network DPI.

The network element 300 also includes an OPT-OUT cookie injection engine 50 that implements the OPT-OUT public cookie injection to HTTP requests and HTTP responses. The exact information that should be injected is given by the tracking domain database 20 which specifies the list of cookies used for OPT-OUT.

In addition an information cleaning engine 60 implements the removing or cleaning process of user behavior information used for tracking. This module 60 removes all application cookies used for tracking, specified in 20, and also removes tracking information in URLs and other HTTP headers. The exact implementation is domain dependent.

A hook URL injection scheduler module 40 implements the process required for tracking OPT-OUT for encrypted traffic. The goal is to minimize the number of injected hook URLs, and at the same time maximize the tracking OPT-OUT coverage. Given an end-user, the hook URL injection scheduler module 40 has to inject hook URLs for following purposes: a) to check the current end-user status of tracking domains; b) to perform tracking OPT-OUT; and c) to perform tracking OPT-IN.

In order to implement a), the status information of each tracking domain in 30 is associated with a timestamp and an expiration period. After the expiration period, the information is removed from the third database 30, indicating that the real status is unknown and should be checked again. Each time that the OPT-OUT cookie of a given tracking domain is seen, the timestamp of the status information is updated. As result, for those tracking domain that the network element 300 constantly sees traffic, the status information is never expired, so don't need to be checked with hook requests. Once status information of a given tracking domain is expired, the domain becomes a candidate to be checked by the hook URL injection scheduler module 40.

Given all tracking domains that required hook URL injection, the hook URL injection scheduler module 40 performs the URL injection scheduler. For each unencrypted HTML page, the hook URL injection scheduler module 4 injects up to N hook URLs. The hook URL injection scheduler module 40 selects the N tracking domains that take into account following parameters: the last time that the URL associated with a tracking domain is injected, the popularity of the tracking domain, and the observed end-user traffic to the tracking domain.

While the foregoing is directed to embodiments of the present invention, other and further embodiments of the invention may be devised without departing from the basic scope thereof. For example, other aspects may be implemented in hardware or software or in a combination of hardware and software.

Additionally, the software programs included as part of the invention may be embodied in a computer program product that includes a computer useable medium. For example, such a computer usable medium can include a readable memory device, such as a hard drive device, a flash memory device, a CD-ROM, a DVD/ROM, or a computer diskette, having computer readable program code segments stored thereon. The computer readable medium can also include a communications link, either optical, wired, or wireless, having program code segments carried thereon as digital or analog signals.

The scope of the present invention is determined by the claims that follow.

The invention claimed is:

1. A computer-implemented method for tracking OPT-OUT user preferences in a global communication network including at least one computing device of a user, a network device, an online system, and a tracking server, the method comprising:

performing, by the at least one computing device of a user whose OPT-OUT preferences are going to be tracked, at least one operation request including a hypertext transfer protocol (HTTP) request for a service of the online system through said global communication network;

tracking, by the network device, said performed at least one operation request; and detecting, by the network device, whether said tracked operation request is linked to a tracking mechanism, wherein:

when a result of said detection indicates that the operation request is not linked to a tracking mechanism, the method further comprises bypassing, by the network device, the operation request to said online system without performing any action; or when the result of said detection indicates that the operation request is linked to a tracking mechanism, the method further comprises:

identifying, by the network device, whether an OPT-OUT or an Opt-In status related to the user is included in the operation request; and
selectively sending, by the network device, the operation request to the tracking server depending on the result of said identification,
wherein identifying the OPT-OUT or an OPT-IN status comprises identifying whether an OPT-OUT cookie indicative of said user preferences is included in the operation request and identifying the OPT-OUT user preferences for said service, and
wherein the user preferences indicate a desire of the user that information about him/her when performing the operation request not be collected,
wherein a result of said identification indicates that the user wants to be OPT-OUT in said service but the operation request does not include an OPT-OUT cookie, the method further comprises:
including, by the network device, in the operation request a public OPT-OUT cookie indicating the OPT-OUT user preferences for said service;
removing, by the network device, information about the user included in the operation request;
sending, by the network device, the operation request to the tracking server; and
tracking, by the network device, a response from the tracking server to the computing device of the user of the operation request for said service, wherein: when the response of the tracking server is unencrypted, the method further comprises including, by the network device, in the response said public OPT-OUT cookie indicating the OPT-OUT user preferences for said service; or when the response of the tracking server is encrypted, the method further comprises:
requesting, by the computing device of the user, at least one unencrypted HTTP request for a hypertext markup language (HTML) page;
capturing and injecting, by the network device, in said HTML page, an additional unencrypted HTTP request to the tracking server; and
upon the network device having captured the additional unencrypted HTTP request to the tracking server, responding, by the network device, to the computing device of the user with the public OPT-OUT cookie of the tracking server indicating the OPT-OUT user preferences for the tracking service, so that all subsequent encrypted HTTP secure (HTTPS) requests to tracking server will also contain the OPT-OUT cookie.

2. The method of claim 1, wherein when the response of the tracking server is encrypted, the method further comprises including the additional unencrypted request as an HTTP request to the tracking server for a transparent image of a certain pixel size at the end of an html body of said HTTP request to online system.

3. The method of claim 1, wherein when the response of the tracking server is encrypted, the method further comprises including the additional unencrypted request as an HTTP request to the tracking server for a transparent image of a certain pixel size in a first line of a head section of an html body of said HTTP request to online system.

4. A method, comprising: receiving, by a network device and from a computing device of a user whose OPT-OUT preferences are going to be tracked, at least one operation request including a hypertext transfer protocol (HTTP) request for a service of an online system through a global communication network;

tracking, by the network device, the at least one operation request performed by the computing device of the user;
detecting, by the network device, whether the tracked operation request is linked to a tracking mechanism, wherein: when a result of the detection indicates that the operation request is not linked to tracking mechanism, the method further comprises bypassing, by the network device, the operation request to the online system without performing any action; or when the result of the detection indicates that the operation request is linked to a tracking mechanism, the method further comprises:
identifying, by the network device, whether an OPT-OUT or an OPT-IN status related to the user is included in the operation request; and
providing, by the network device and to the computing device of the user, the OPT-OUT cookie based on the response to permit the computing device of the user to provide the OPT-OUT cookie to the server device,
selectively sending, by the network device, the operation request to the tracking server depending on the result of the identification,
wherein identifying the OPT-OUT or an OPT-IN status comprises identifying whether an OPT-OUT cookie indicative of the user preferences is included in the operation request and identifying the OPT-OUT user preferences for the service, and
wherein the user preferences indicate a desire of the user that information about him/her when performing the operation request not be collected,
wherein a result of the identification indicates that the user wants to be OPT-OUT in the service but the operation request does not include an OPT-OUT cookie, the method further comprises:
including, by the network device, in the operation request a public OPT-OUT cookie indicating the OPT-OUT user preferences for the service;
removing, by the network device, information about the user included in the operation request;
sending, by the network device, the operation request to the tracking server; and
tracking, by the network device, a response from the tracking server to the computing device of the user of the operation request for the service, wherein: when the response of the tracking server is unencrypted, the method further comprises including, by the network device, in the response the public OPT-OUT cookie indicating the OPT-OUT user preferences for the service; or when the response of the tracking server is encrypted, the method further comprises:
receiving, by the network device and from the computing device of the user, at
least one unencrypted HTTP request for a hypertext markup language (HTML) page;
capturing and injecting, by the network device, in the HTML page, an additional unencrypted HTTP request to the tracking server; and
upon the network device having captured the additional unencrypted HTTP request to the tracking server, responding, by the network device, to the computing device of the user with the public OPT-OUT cookie of the tracking server indicating the OPT-OUT user preferences for the tracking service, so that all subsequent encrypted HTTP secure (HTTPS) requests to tracking server will also contain the OPT-OUT cookie.

5. A network device for tracking Opt-Out user preferences in a global communication network, comprising:

one or more processors to:
store Opt-Out user preferences defined by at least one user about information the user wants to share in different tracking mechanisms;
store tracking information of services of an online system;
store a current status of said Opt-Out user preferences when a computing device of the user performs an operation request including an HTTP request for at least one service of the online system through said global communication network;
track the operation request;
detect whether said tracked operation request is linked to a tracking mechanism; and
depending on a result of said detection:
bypass the operation request to said online system when a result of said detection indicates that the operation request is not linked to a tracking mechanism; or
identify whether an Opt-Out or an Opt-In status is included in the operation request when the result of said detection indicates that the operation request is linked to a tracking mechanism; and
selectively send the operation request to a tracking server depending on the result of said identification, wherein
when a result of said identification indicates that the user wants to be OPT-OUT in said service but the operation request does not include an OPT-OUT cookie, the one or more processors are to include in the operation request a public Opt-Out cookie indicating the Opt-Out user preferences for said service and include said public Opt-Out cookie in a response of the operation request for said service performed from the tracking server to the user;
remove information about the user included in the operation request;
send the operation request to the tracking server; and
track a response from the tracking server to the computing device of the user of the operation request for said service; and
wherein when the response of the tracking server is unencrypted, the one or more processors are to include in the response said public OPT-OUT cookie indicating the OPT-OUT user preferences for said service; or
when the response of the tracking server is encrypted, the one or more processors are to include in the operation request, when the tracking server is using encrypted HTTP connections, an additional data field containing an unencrypted HTTP request indicating the OPT-OUT user preferences for said service.

6. The network device of claim 5, wherein the one or more processors are to: remove information of the user included in the operation request; or include a cookie expiration instruction in the operation request which contains an expiration data for an Opt-Out cookie previously included in the operation request.

7. A non-transitory computer-readable medium storing instructions, the instructions comprising: one or more instructions that, when executed by one or more processors of a system, cause the one or more processors to perform the method of performing, by at least one computing device of a user whose OPT-OUT preferences are going to be tracked, at least one operation request including a hypertext transfer protocol (HTTP) request for a service of an online system through a global communication network;
tracking, by a network device, said performed at least one operation request; and
detecting, by the network device, whether said tracked operation request is linked to a tracking mechanism, wherein:
when a result of said detection indicates that the operation request is not linked to a tracking mechanism, the method further comprises bypassing, by the network device, the operation request to said online system without performing any action; or when the result of said detection indicates that the operation request is linked to a tracking mechanism, the method further comprises: identifying, by the network device, whether an OPT-OUT or an Opt-In status related to the user is included in the operation request; and selectively sending, by the network device, the operation request to a tracking server depending on the result of said identification,
wherein identifying the OPT-OUT or an OPT-IN status comprises identifying whether an OPT-OUT cookie indicative of said user preferences is included in the operation request and identifying the OPT-OUT user preferences for said service, and
wherein the user preferences indicate a desire of the user that information about him/her when performing the operation request not be collected,
wherein a result of said identification indicates that the user wants to be OPT-OUT in said service but the operation request does not include an OPT-OUT cookie, the method further comprises:
including, by the network device, in the operation request a public OPT-OUT cookie indicating the OPT-OUT user preferences for said service;
removing, by the network device, information about the user included in the operation request;
sending, by the network device, the operation request to the tracking server; and
tracking, by the network device, a response from the tracking server to the computing device of the user of the operation request for said service, wherein:
when the response of the tracking server is unencrypted, the method further comprises including, by the network device, in the response said public OPT-OUT cookie indicating the OPT-OUT user preferences for said service; or when the response of the tracking server is encrypted, the method further comprises:
requesting, by the computing device of the user, at least one unencrypted HTTP request for a hypertext markup language (HTML) page;
capturing and injecting, by the network device, in said HTML page, an additional unencrypted HTTP request to the tracking server; and
upon the network device having captured the additional unencrypted HTTP request to the tracking server, responding, by the network device, to the computing device of the user with the public OPT-OUT cookie of the tracking server indicating the OPT-OUT user preferences for the tracking service, so that all subsequent encrypted HTTP secure (HTTPS) requests to tracking server will also contain the OPT-OUT cookie.

8. The non-transitory computer-readable medium of claim 7, wherein when the result of said identification indicates that the user wants to be OPT-IN in said service and the operation request includes an OPT-OUT cookie, the network device comprises including a cookie expiration instruction in the operation request, said cookie expiration instruction containing an expiration data for the OPT-OUT cookie previously included in the operation request.

\* \* \* \* \*